May 3, 1960 W. W. WHEELER 2,935,101
CORE VENEER BAND SAW
Filed Aug. 12, 1958 3 Sheets-Sheet 1
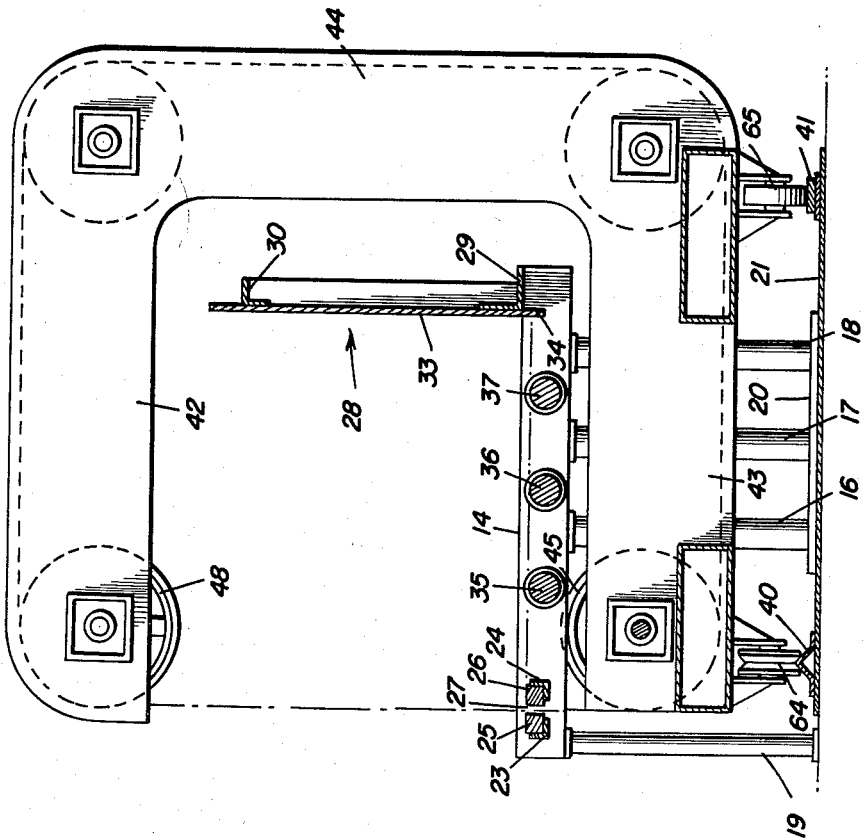
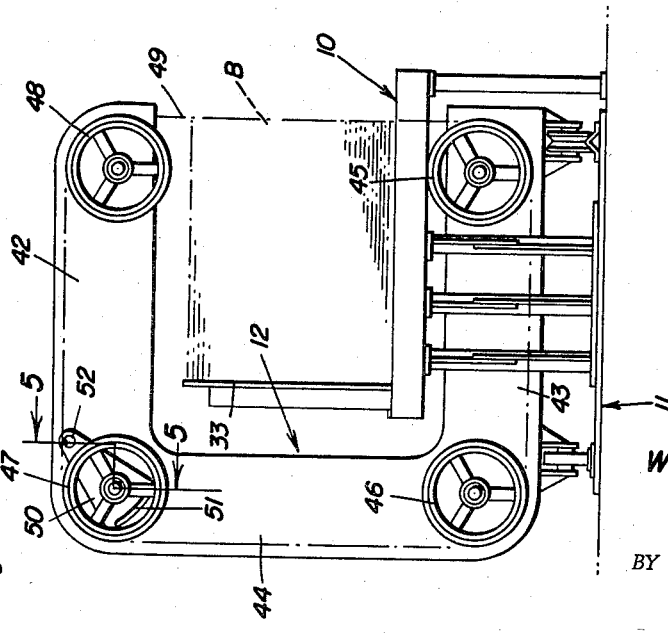
Walter W. Wheeler
INVENTOR.

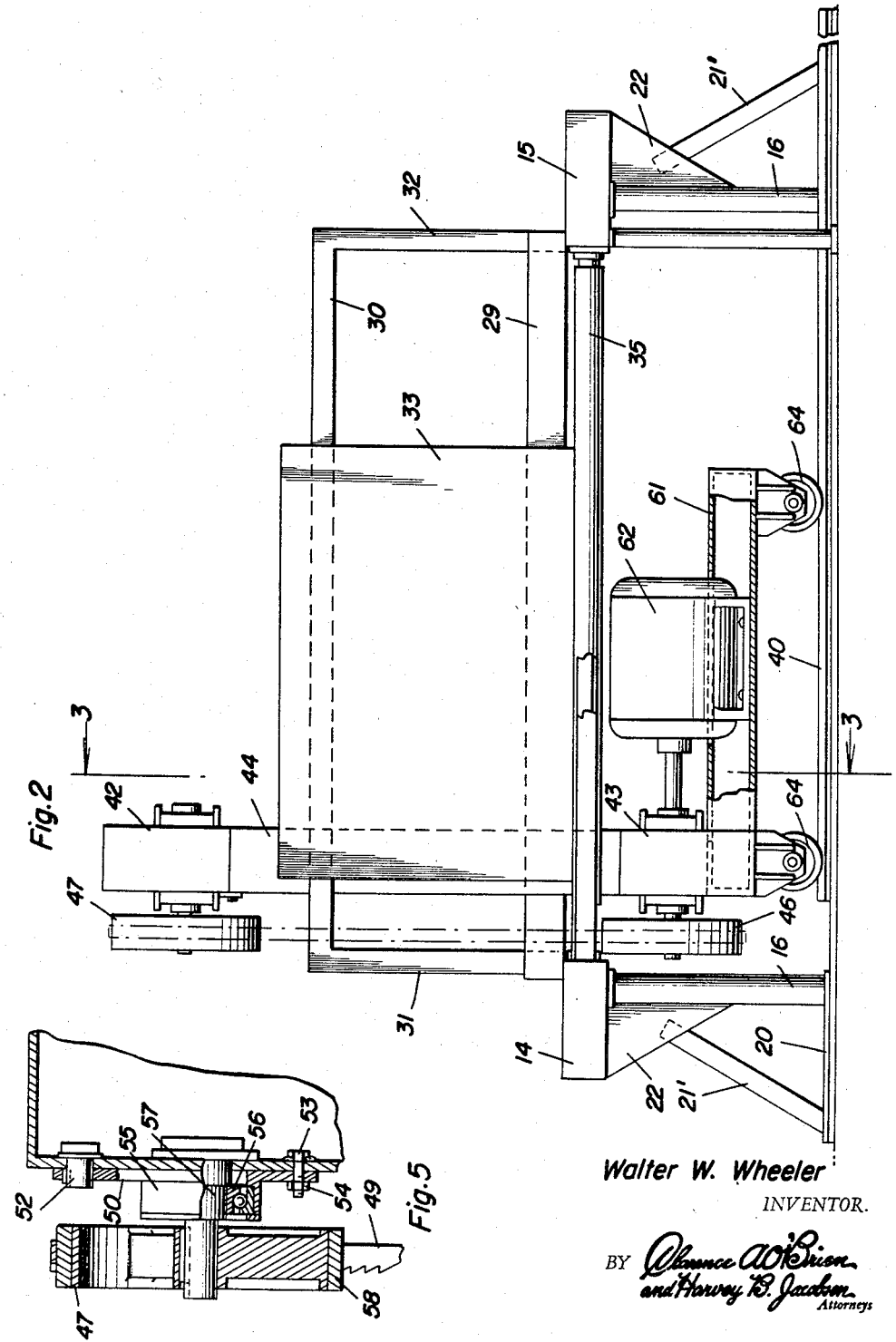

May 3, 1960 W. W. WHEELER 2,935,101
CORE VENEER BAND SAW
Filed Aug. 12, 1958 3 Sheets-Sheet 3

Walter W. Wheeler
INVENTOR.

United States Patent Office 2,935,101
Patented May 3, 1960

2,935,101

CORE VENEER BAND SAW

Walter W. Wheeler, Lebanon, Oreg.

Application August 12, 1958, Serial No. 754,549

8 Claims. (Cl. 143—21)

This invention relates in general to a saw works and pertains more particularly to an assembly for cutting core veneer for the manufacture of plywood.

The present practice in veneer mills is to cut sheets of veneer to the desired size by using a table saw or hand saw which will handle not more than 10 to 15 sheets of veneer at one time. It is therefore of primary concern in connection with this invention to provide a saw capable of handling a bundle of veneer of considerable thickness and containing as many as about 500 sheets of veneer.

Another object of this invention is to provide a special saw assembly for cutting core veneer for use in manufacture of plywood wherein not only is a large number of sheets capable of being handled by the machine but also the saw will eliminaate all tearing or slivering of the veneer such as is commonly encountered by present methods and machinery.

Still another object of this invention is to provide an efficient and compact saw mechanism for cutting core veneer for plywood wherein the assembly includes a support table onto which a bundle of veneer is to be fed and including a back stop for positioning the bundle of veneer on the table for operation thereupon by the saw, the saw being carried by a track assembly and movable therealong transversely of a bundle of veneer supported endwise on the table support and for effecting the cutting of a large number of sheets simultaneously.

A further object of this invention is to provide an improved saw assembly for cutting core veneer for the manufacture of plywood incorporating a supporting table having end platforms rigidly interconnected by a back stop mechanism at one end thereof and at the other end by a saw guide assembly, the entire assemblage being supported by uprights and having, beneath the support assembly, a track assemblage supporting a generally C-shaped frame carrying rollers over which a band saw is trained and the C-shaped frame having lateral side extensions one of which mounts a power source for driving the band saw with such frame and extension being provided with supporting wheels engaged with the track assemblage for movement transversely of a bundle of veneer supported on the table assembly.

These together with other objects and advantages which will become subsequently apparent reside in the details of construction and operation as more fully hereinafter described and claimed, reference being had to the accompanying drawings wherein like numerals refer to like parts throughout, and in which:

Figure 1 is a side elevational view of a saw constructed in accordance with this invention and illustrating a bundle of veneer thereon which has been cut to length;

Figure 2 is an enlarged front elevational view of the assembly shown in Figure 1 with portions thereof broken away to illustrate certain details of construction;

Figure 3 (sheet 1) is a vertical section taken substantially along the plane of section line 3—3 of Figure 2 showing further details of the construction of the saw assemblage;

Figure 4:
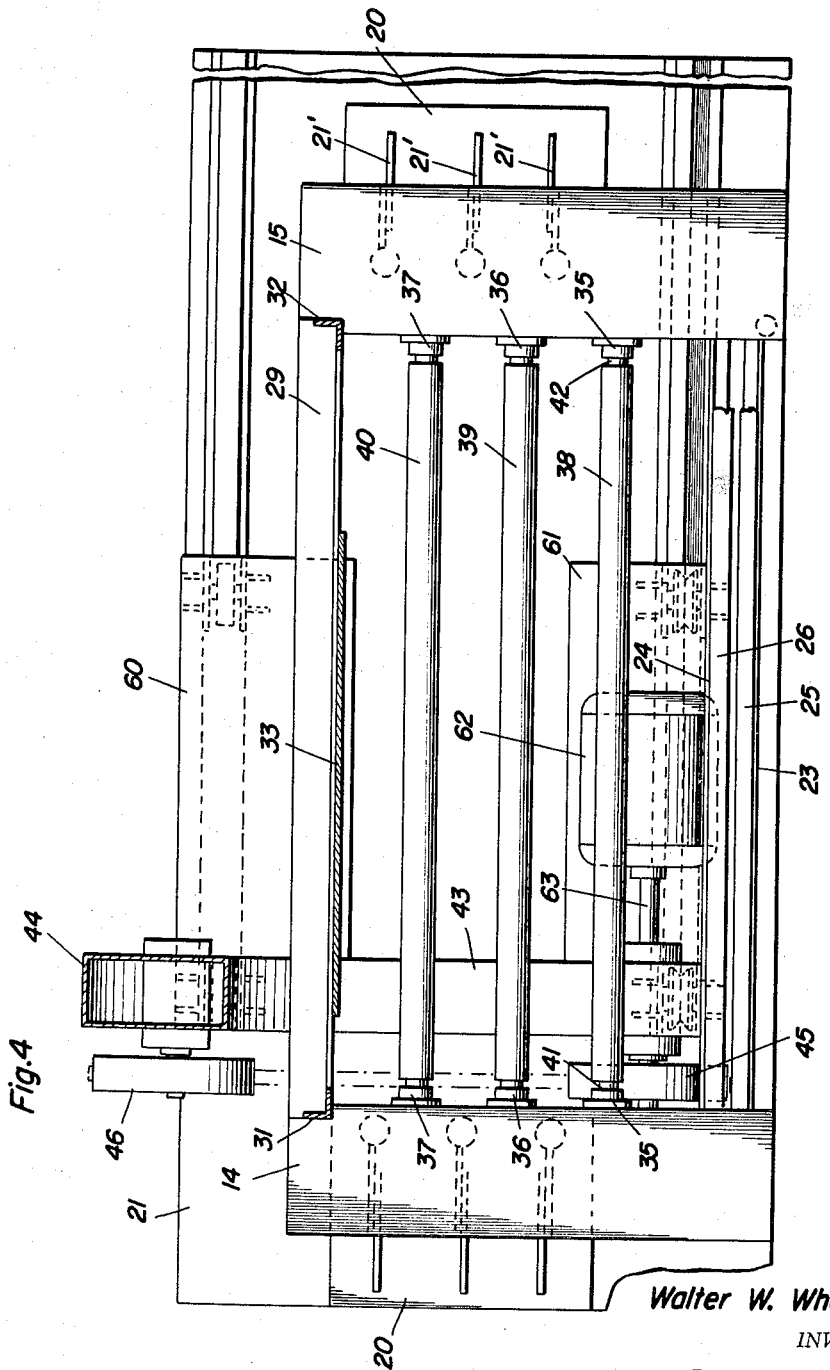

Figure 4 (sheet 3) is a horizontal section taken through the machine immediately above the supporting table thereof; and Figure 5 (sheet 2) is an enlarged vertical section taken substantially along the plane of section line 5—5 in Figure 1 illustrating details of the construction of the idler roller assemblage.

Referring now more particularly to the drawings, the reference numeral 10 indicates in general the supporting table assemblage whereas reference numeral 11 indicates in general a track assemblage and reference numeral 12 indicates in general the saw assemblage.

The table assembly, as can be best seen in Figures 2—4 inclusive includes a pair of elongate end tables or platforms 14 and 15 disposed in spaced parallel relationship and supported in elevated position with respect to the supporting surface by a plurality of uprights 16, 17, 18 and 19. The uprights 16, 17 and 18 are preferably mounted upon a common plate element 20 which, in turn, is rigidly secured to a base plate 21 of the track assemblage 11, as hereinafter described. In any event, all of the uprights for each table are preferably rigidly anchored so as to effect a firm support for the entire machine. As can be best seen in Figure 2, the plate 20 in each case is preferably provided with diagonal bracing elements 21' extending therefrom to gusset plates 22 between the uprights 16, 17 and 18 and the corresponding platforms or tables 14 and 15. At the forward edge of the table assembly, the platforms 14 and 15 are rigidly interconnected by means of a pair of opposed but spaced angle members 23 and 24 (Figures 3 and 4) having nested therein a pair of square guide bars 25 and 26 having a narrow opening 27 therebetween for purposes which will be presently apparent. Thus, the forward edge of the platforms 14 and 15 are rigidly interconnected.

A back stop assembly indicated generally by the reference character 28 (Figure 3) serves to rigidly interconnect the platforms 14 and 15 along their rear edges and, as can be seen, this assembly includes a framework of angle iron including the lower horizontal member 29, the upper horizontal member 30 and the opposite vertical end members 31 and 32 (Figures 2 and 3), forming an open rectangular framework which is rigidly interconnected between the platforms 14 and 15 serving to interconnect the same at the rear edges thereof. A vertical back stop plate 33 is rigidly affixed between the upper and lower horizontal members 30 and 29 respectively with the lower edge portion 34 of this back stop plate extending somewhat below the level of the upper surfaces of the platforms 14 and 15 as can be seen most clearly in Figure 3.

Each platform 14 and 15 is provided along the inner edge thereof with a plurality of journal or bearing members 35, 36 and 37 and a series of rollers 38, 39 and 40 (Figure 4) are carried thereby. Each roller has stub axle end portions 41 and 42 received in corresponding pairs of bearing members 35, 36 and 37 such that the individual rollers are freely and rotatably supported between the platforms 14 and 15 and preferably with the rollers positioned with respect to the upper surfaces of the platforms 14 and 15 in the manner illustrated in Figure 3.

As previously mentioned, the track assemblage 11 includes a base plate member 21 to which certain of the uprights for the table supporting assembly are rigidly connected. Additionally, the base plate 21 rigidly carries a V-shaped track element 40 and a flat track element 41, the same being disposed in spaced parallel relationship and in straddling relationship to the intermediate uprights 16, 17 and 18 as will be clearly seen. The saw frame is of generally C-shaped configuration including an upper horizontal leg portion 42, a lower horizontal leg portion 43 and an intermediate vertical bight portion 44 rigidly interconnecting corresponding ends of the two legs 42 and 43 and positioned to lie behind the back stop assemblage 28. The saw frame is preferably of hollow rectangular configuration in cross-section so as to lend a maximum of rigidity to the assemblage while retaining lightweight characteristics. The saw frame rotatably carries a plurality of pulleys or rollers 45, 46, 47 and 48 located relative to each other and to the saw frame in the manner best illustrated in Figure 1 and trained about these rollers is the endless band saw element 49. The roller 47, as can be best seen in Figures 1 and 5, is mounted to the frame by means of a bracket 50 of generally triangular shape having its base provided with an elongate arcuate slot 51 and having its opposed apex pivotally attached to the saw frame by means of an outstanding pin element 52, there being provided a fastener 53 projecting from the saw frame through the slot 51, nut 54 serving to retain the bracket on the saw frame and yet permitting the same to be swung about the pivot pin 52 so as to apply the proper tension upon the band saw element 49. The bracket includes a generally centrally disposed hub portion 55 mounting a suitable bearing 56 therein rotatably journaling the inner end of a stub axle 57 upon which the pulley 47 is directly mounted. Each pulley, as can be seen in Figure 5, is preferably provided with a rubber sleeve or covering 58 to assure an effective grip on the band saw 49.

The saw frame includes, as can be best seen in Figure 4, lateral side extensions 60 and 61 projecting laterally from the opposite ends of the lower horizontal leg portion 43, the forward extension serving as a mounting means for an electric motor 62 having its drive shaft 63 projecting therefrom and through the saw frame to drive the pulley 45 and thus effect operation of the band saw. Four wheels are provided for supporting the saw frame assemblage upon the tracks 40 and 41 two of which, as indicated by the reference character 64 are peripherally V'd to accommodate the V-track 40 and the other pair of which 65 are of smooth outer contour to contact the flat track 41.

In actual operation the machine is so set up that the rollers 35, 36 and 37 are at the end of a conveyor system carrying the bundle of veneer. With the saw assembly in the position as illustrated in Figures 2 and 4, the core veneer is fed onto the supporting table assembly until it engages the back stop plate 33 whereafter the saw assembly is moved to the right by any suitable means so as to effect a cutting of the bundle of veneer and to leave a bundle B as can be seen in Figure 1 of predetermined length and having a thickness in the order of approximately 509 sheets. In this manner, a very rapid and efficient cutting and sizing of the core veneer sheets is obtained without tearing or splintering of the cut edges of the bundle left on the supporting table of the machine.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A core veneer saw assembly comprising a support, said support including a pair of spaced, parallel tables, a plurality of uprights rigid with said tables to position the same in elevated relation to a supporting surface, a back stop assembly rigidly connecting said tables at one end thereof and including a vertical plate intermediate said tables and extending thereabove, a plurality of rollers journaled at their opposite ends between said tables for supporting a bundle of veneer being moved into end engagement with said back stop, a track assembly positioned below said support and including front and rear tracks parallel to said rollers and straddling said uprights, a vertically disposed, C-shaped saw frame including a lower horizontal leg underlying said rollers, an upper horizontal leg overlying said rollers, and a vertical bight portion interconnecting said upper and lower legs beyond said one end of the tables, a pair of horizontal platforms rigid with and projecting laterally from opposite ends of said lower leg in overlying relation to said front and rear tracks, wheels journaled from said platform engaging said tracks whereby said saw frame may be moved back and forth past said back stop, a band saw blade carried by said saw frame, and means mounted on one of said platforms for driving said saw blade.

2. The assembly as defined in and by claim 1 wherein said tracks are mounted in a common base plate with certain of said uprights being anchored thereto.

3. The assembly as defined in and by claim 1 including spaced band saw guide members rigidly interconnecting said tables at the forward ends thereof.

4. The assembly as defined in and by claim 3 wherein said saw guide members include parallel angle iron members disposed in opposed relation, a rectangular guide bar nested within and rigid with each angle iron defining a saw guide space therebetween.

5. A saw assembly for simultaneously cutting a large number of core veneer sheets to a predetermined length, comprising a track assembly including a pair of parallel track members, a band saw assembly movably supported on said track members and including a C-shaped saw frame extending transversely of said tracks, a support table assembly including spaced, parallel rollers positioned within the jaws of said saw frame and extending in the direction of the travel of said saw assembly, and a back stop carried by said support table assembly for end engagement with an elongate bundle of core veneer sheets moving over said rollers transversely of the travel of said saw assembly.

6. The combination of claim 5 wherein said support table includes a pair of spaced, parallel tables positioned at opposite ends of said rollers, said tables being positioned within the jaws of said saw frame, said back stop interconnecting said tables at one end thereof.

7. The combination of claim 6 wherein said saw frame includes a lower horizontal leg underlying said rollers, an upper horizontal leg overlying said roller and a vertical bight portion interconnecting said upper and lower legs beyond said one end of the tables.

8. The combination of claim 7 including a pair of horizontal platforms rigid with and projecting laterally from opposite ends of said lower leg in overlying relation to said track members, wheels journaled from said platform engaging said tracks.

References Cited in the file of this patent

UNITED STATES PATENTS

| | | |
|---|---|---|
| 428,785 | Rodgers | May 27, 1890 |
| 825,518 | Cox | July 10, 1906 |
| 1,001,272 | Howard | Aug. 22, 1911 |
| 1,262,943 | Gustafson | Apr. 16, 1918 |
| 1,381,418 | Hunter | June 14, 1921 |